W. B. JOHNSON.
CHUCK.
APPLICATION FILED APR. 3, 1908.
906,029. Patented Dec. 8, 1908.
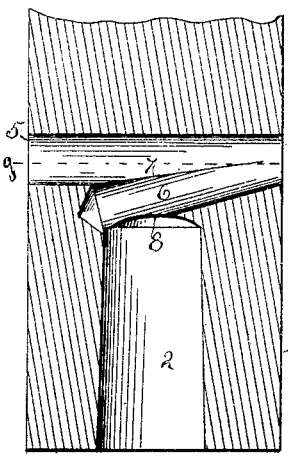
Fig. 1.
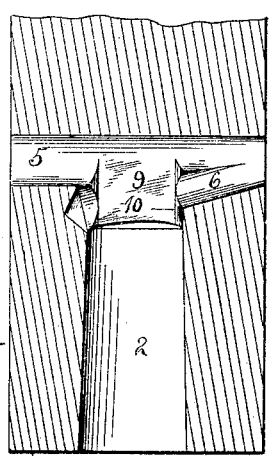
Fig. 2.
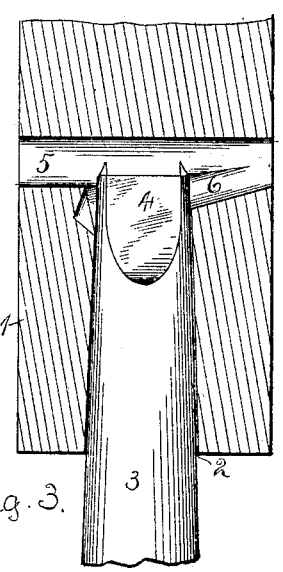
Fig. 3.
Fig. 4.
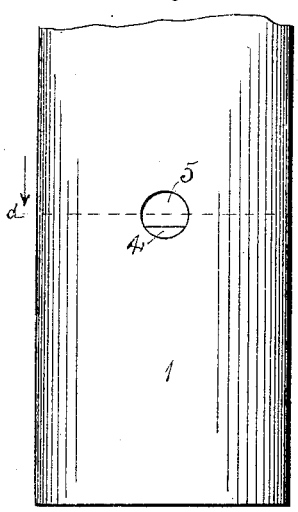
Fig. 5
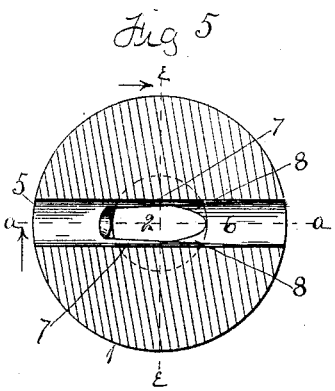
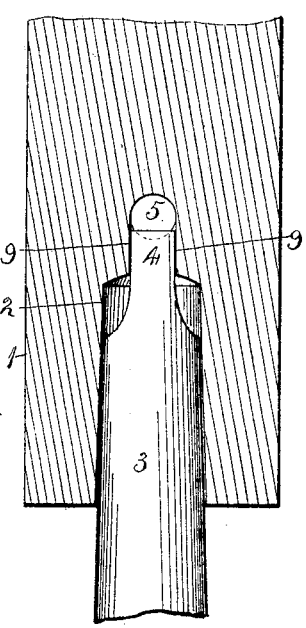
Fig. 7.
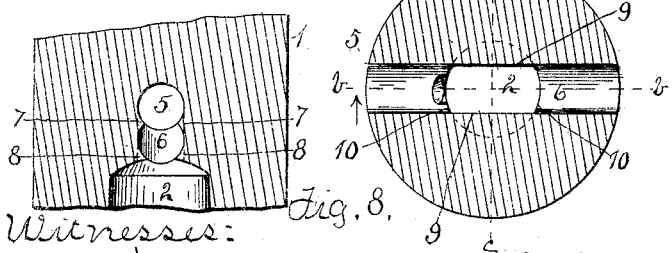
Fig. 6.
Fig. 8.
Witnesses:
G. Ward.
E. Behel.
Inventor:
William B. Johnson.
By A. O. Behel
Atty.

WILLIAM B. JOHNSON, OF ROCKFORD, ILLINOIS.

CHUCK.

No. 906,029.

Specification of Letters Patent.

Patented Dec. 8, 1908.

Application filed April 3, 1908. Serial No. 424,912.

*To all whom it may concern:*

Be it known that I, WILLIAM B. JOHNSON, a citizen of the United States, residing at Rockford, in the county of Winnebago and State of Illinois, have invented certain new and useful Improvements in Chucks, of which the following is a specification.

The object of this invention is to form a seat in a chuck for a tool carried thereby.

In the accompanying drawings. Figure 1 is a lengthwise section on dotted line $a\,a$ Fig. 5. Fig. 2 is a lengthwise section on dotted line $b\,b$ Fig. 6. Fig. 3 is a lengthwise section on dotted line $b\,b$ Fig. 6 with the tool in position. Fig. 4 is a face elevation. Fig. 5 is a transverse section on dotted line $g\,g$ Fig. 1. Fig. 6 is a transverse section on dotted line $d\,d$ Fig. 4. Fig. 7 is a lengthwise section on dotted line $c\,c$ Fig. 6, in which the tool is in position. Fig. 8 is a lengthwise section on dotted line $e\,e$ Fig. 5.

The check is intended to be formed integral with the drill spindle, the lower portion of which is shown at 1 in the drawings. This spindle has a lengthwise tapering opening 2 for the reception of drill or other tool 3. This tool has a reduced end 4 formed by reducing the sides thereof. It is the practice to form a lengthwise slot in the spindle adjacent to the tapering opening of a size to receive the end of the tool by which the tool is held in driving connection with the spindle. In forming the slot in the spindle, the spindle was considerably weakened and the formation of the slot was expensive. It is to cheapen the construction and remove the objections above mentioned that I have invented the chuck herein shown and described.

Some distance above the end of the tapering opening 2 is bored a hole 5 transverse to the length of the spindle. The diameter of this hole is slightly larger than the thickness of the end 4 of the tool. A hole 6 of the same size as the hole 5 is bored diagonally to the length of the spindle starting from one end of the hole 5 and cutting through the end of the tapering opening 2 as shown at Fig. 1. A tool slightly larger than the end 4 and of the same conformation is placed in the tapering opening 2 until it contacts with the end of the tapering opening 2. The tool is then forced in, cutting away the inward projecting portions 7 and 8 formed by the diagonal hole 6 in connection with the hole 5 and tapering opening 2, which will form flat surfaces 9 and rounded ends 10 conforming to the end 4 of the tool shank 3. By thus constructing the surface for the end 4 of the tool shank, only the ends of the hole 5 will show as appears at Fig. 4. The end 4 of the tool shank 3 will project into the hole 5 as shown at Figs. 3, 4 and 7 in order that the tool shank may be driven down to liberate it from the tapered opening 2.

Fig. 1 is a section before the inward projecting portions 7 and 8 are cut away. Fig. 2 is a similar section after the projections are cut away. Fig. 5 is a transverse section before the projections are cut away, and Fig. 6 is a similar section after they are cut away. Fig. 8 is a lengthwise section transverse of the holes 5 and 6 before the projections are removed.

I claim as my invention.

1. The method of forming a seat for a tool in a drill spindle consisting in drilling an opening lengthwise of the spindle, drilling a hole transversely through the spindle adjacent to the end of the lengthwise opening, drilling a hole diagonally to the length of the spindle and cutting the end of the lengthwise opening, and also cutting through the bottom of the transverse hole, and finally removing the inward projections formed by the diagonal opening, thereby forming flat surfaces.

2. A drill spindle having a lengthwise opening, a transverse opening located adjacent to the end of the lengthwise opening, a diagonal hole cutting the end of the lengthwise opening and the bottom of the transverse hole, and parallel flat surfaces at the end of the lengthwise opening.

In testimony whereof I have hereunto set my hand in presence of two subscribing witnesses.

WILLIAM B. JOHNSON.

Witnesses:
  A. O. BEHEL,
  E. D. E. N. BEHEL.